May 21, 1968     N. C. DAHL     3,383,974

LOAD INDICATING MEANS

Filed July 21, 1967     3 Sheets-Sheet 1

INVENTOR.
NORMAN C. DAHL
BY
Richard P. Crowley
ATTORNEY

May 21, 1968 N. C. DAHL 3,383,974
LOAD INDICATING MEANS
Filed July 21, 1967 3 Sheets-Sheet 3

INVENTOR.
NORMAN C. DAHL
BY
Richard P. Crowley
ATTORNEY

United States Patent Office 3,383,974
Patented May 21, 1968

3,383,974
LOAD INDICATING MEANS
Norman C. Dahl, 40 Fern St., Lexington, Mass. 02173
Filed July 21, 1967, Ser. No. 655,112
8 Claims. (Cl. 85—62)

ABSTRACT OF THE DISCLOSURE

A fastening member such as a bolt or nut, which has visual means to indicate when the design axial load of the member has been reached. An external disk-shaped annular groove in the outer wall of the bolt head or nut between the upper and lower faces is filled with a flowable incompressible material. An internal annular groove is located near or at the juncture of the lower face and the threaded diameter. The external and internal grooves are of such depths that the grooves overlap and thus in the region of overlap the material in the section between the grooves is capable of deforming in axial shear. When the member carries the axial load for which it was designed the yield force in the shear section is reached and the section plastically deforms in axial shear, closing the external groove and extruding the flowable material to give visual evidence that the design load has been reached.

Background of the invention

This invention relates to a load indicating fastening member and more particularly to a nut or bolt which incorporates its own visual or electrical indicator which signals when the load the member was designed to carry has been reached.

In tightening bolts and nuts to clamp abutting surfaces, it is always desirable to tighten the bolt until the load it was designed to carry is reached. If the bolt is not tightened enough the abutting surfaces may slide on one another or, if the bolt is subjected to alternating loads, the bolt may fail due to fatigue after an unexpectedly small number of alternations of load. If the bolt is tightened too much it may fail due to excessively high stresses.

The common method to determine the load carried by a bolt is to use a torque wrench to measure the torque applied to the bolt during installation. The required installation torque is determined by empirical data from torque versus bolt load tests in the laboratory where the bolt load can be measured directly by suitable instruments. This method is satisfactory where the installation conditions can be duplicated in the laboratory but, unfortunately, in most cases this is difficult and in some cases impossible because the installation conditions cannot be predicted with accuracy. For example, the installation torque is influenced by such factors as the materials used in the bolt and nut, the smoothness of the machining of the threads, the type of plating, the lubricant used, the surfaces on which the bolt and nut bear, and the self-locking torque built into either the nut or bolt. A thirty or forty percent error in predicting the effective overall coefficient of friction is not uncommon and this error is reflected directly in the load carried by the bolt. A further difficulty with this method lies in the fact that there is no direct way to determine whether an installed bolt carries its design load; a torque wrench can be applied to check the installation torque but in the absence of experimental data on torque versus load under these conditions the value of the bolt load will remain in some doubt.

Another method to measure load is to calibrate the deformation of a bolt head under a given load condition. As disclosed in U.S. Patent No. 2,543,705, the bolt head elastically deforms and closes slots in the bolt head, which deformation is then measured with an instrument. In U.S. Patent No. 3,194,015, a recess in the lower surface of either a bolt head or a nut is brought closer to the abutting surface by plastic deformation resulting when a specified axial force causes yielding; the closure is either measured by feeler gauges or estimated by eye.

Torque and load indicators which employ stress sensitive materials have also been suggested. U.S. Patent No. 3,224,316 shows a bolt head or a nut in which there is a cylindrical recess filled with a stress sensitive material which either fractures, changes color or generates a voltage when the walls of the recess move relative to each other under the action of a specified torque or of a specified axial load.

Load indicating members in the form of washers which undergo plastic deformation is another approach which has been pursued. U.S. Patent No. 3,174,386 shows a washer consisting of a cylindrical section integrally formed with two disk shaped end sections and of such proportions that when a specified axial load is applied the cylindrical section plastically collapses outwards. U.S. Patent No. 3,306,154 shows a washer of similar structural shape but proportioned such that the cylindrical section plastically collapses inwards.

The methods which require measurement of the deformation of a bolt head or a nut are not satisfactory because frequently such measurements are difficult to obtain, either because of the accuracy required or because the location makes measurement virtually impossible. The use of stress sensitive materials has several drawbacks, such as high cost of manufacture and the probability of erratic loads resulting from the reaction of the material to stress concentrations or unsymmetrical loading during installation, and thus far there are no nuts or bolts of this type which have gained any significant commercial acceptance. Integrally formed washers have the difficulty that the cylindrical section is close to the surface of the bolt and thus there may be a poor distribution of bearing stress under the bolt head or nut unless the cylindrical section is completely collapsed so the end sections bear against each other. Some washer units get around this difficulty by the combination of using heavy washers and two concentric cylinders but this results in an expensive unit with several parts.

Summary of the invention

I have discovered a simple, dependable and economic load indicating member which under all conditions will give a clear visual signal when a predetermined design axial load has been reached in a bolt or nut and which can be arranged to additionally give an electrical signal when this load is reached.

In my invention, an axial shear section is formed in the member between an external and an internal annular groove. The external annular groove is formed in the outer wall of the member between an upper face and a lower face. The lower face or bearing surface contacts an abutting surface against which the member is secured. The internal annular groove is formed near or at the juncture of the lower face and threaded diameter; for example, in a nut the groove is formed in the internal, normally threaded wall and near the lower face and in a bolt head it is formed at the juncture of the lower face and the threaded shaft. The external and the internal grooves are of such depths that the grooves overlap and thus in the region of overlap the material between the grooves is capable of deforming in axial shear. The axial distance between the grooves is made such that the shear section will plastically deform in axial shear when the member supports a specified axial load. The extent of the plastic deformation is controlled by the original width of the external groove. The external groove of the member is filled with a flowable incompressible material.

When a nominal axial load is exerted upon the member through the action of torque applied to the member there is elastic deformation of the shear section, both in axial shear and in torsional shear about the axis of the member. However, this elastic deformation is very small and can be detected only with instruments of great sensitivity; there will be only a minute decrease in the volume of the external groove. On the other hand, when the axial force and torque reach combined values which cause plastic yielding of this shear section the resulting plastic deformation will be relatively large. The axial shear plastic deformation will be much greater than the torsional shear plastic deformation and thus the primary effect will be an axial shear which results in closing of the external groove and a large fractional decrease in the volume of the groove with consequent extrusion of the flowable material to give a clear visual indication that the design load has been reached.

An important advantage of this invention lies in the fact that the member can be easily and accurately inspected visually after installation. If the flowable material is extruded the inspector can be certain that the bolt carries a given minimum load within a small tolerance variation.

Another important advantage lies in the fact that the flowable material in the external groove can be made electrically conducting so the extruding material is capable additionally of closing an electric circuit to signal that the member carrier its design load. This can be accomplished, for example, by having the extruding material contact a circuit terminal located in the wall of the wrench which applies torque to the member. The resulting electrical signal could be used in various ways, such as to turn on a light on a hand wrench or to shut off a power wrench.

Since it is possible that during its life the member may be subjected temporarily to a load well above the design load it is necessary to have protection against excessive plastic deformation due to such high loads. The width of the external groove limits the amount of axial shear plastic deformation and thereby provides the required protection against overloads. Typically, the width of the groove will be made some fraction of the thread pitch so that after extrusion begins the operator will know how far to rotate the member if he wishes to bring the surfaces of the external groove into contact. Alternatively, the operator or inspector can check the closure of the external groove by removing all extruded material and then giving the member an additional small rotation and observing whether additional material is extruded.

The distribution of stresses within the shear section is such that the onset of plastic yielding is controlled mainly by the magnitude of the axial load and is only weakly influenced by large variations in frictional effects. This is in stark contrast to torque measuring devices whose accuracy is directly dependent upon variations in friction.

The member can be designed to give a visual or electrical indication at any specified axial load. For example, if the bolt is designed to carry a load of 5000 lbs. the axial distance between the grooves will have a defined value depending upon the diameters of the overlap region of the grooves and the yield stress of the material from which the member is made. If a similar member made of the same material is to carry a load of 6000 lbs. the axial distance between the grooves will be made proportionally greater.

The closing of the external groove does not have to be measured by any special instruments, nor does a change in color have to be determined visually. The flowable material extrudes only when the design axial load has been reached and it is clearly visible; there is not a gradual extrusion of the material as the yield force in the shear section is approached.

Therefore, my load indicating means in the bolt or nut provides clear visual indication and inspectability, the option of electrical indication, overload protection, reasonable cost and dependable accuracy in the presence of variable friction.

Description of the preferred embodiments

My invention, although applicable to both nuts and bolts, will first be described in detail with reference to the bolt.

Figure 1A:
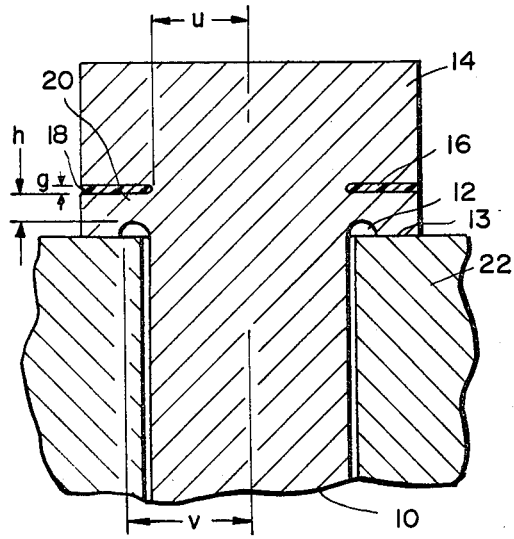
FIGS 1a and b are sectional views of a standard hexagonal bolt head in which my invention is incorporated, illustrating the bolt before and after the design axial load is reached.

In FIG. 1a is a bolt 10 with a hexagonal head 14. An internal annular groove 12 of outer radius $v$ is cut into the lower face 13 of the head 14 at the juncture of the lower face and the bolt shaft. An external disk-shaped annular groove 16 of width $g$ and inner radius $u$ is cut into the outer wall of the head 14 at a distance $h$ above the internal groove and filled with a flowable incompressible material 18. The internal and external grooves overlap to the extent of $v$ minus $u$ and they are separated axially by the distance $h$; these dimensions define the shear section 20 which is capable of deforming in axial shear. The width $g$ of the external groove 16 is preferably made relatively small to limit the amount of plastic deformation that can take place, typically some fraction of the thread pitch.

Figure 1B:
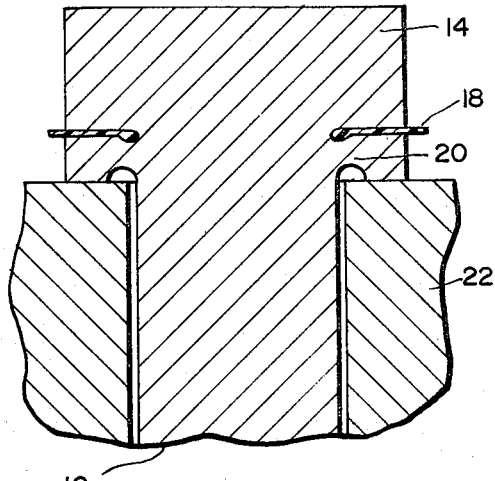

When the bolt 10 is secured to an adjoining surface, such as by a nut (not shown), and the bolt is tightened so that the bolt force is less than the yield load for the shear section 20, the strains in the bolt head 14 are elastic and there is only an extremely small fractional decrease in the volume of the external groove 16. When the design axial load is reached the yield load on the shear section 20 is reached and the section 20 plastically deforms in shear parallel to the bolt axis, closing the groove 16 and extruding the material 18 as shown in FIG. 1b, thus providing a clear visual indication that the bolt is carrying the load for which it was designed. The amount of closure of the external groove 16 depends upon the amount the nut (or bolt) is rotated after extrusion begins; when the groove 16 has been completely closed no further plastic axial shear deformation of the shear section 20 will occur at any bolt load, providing protection against overloads.

Figure 2A:
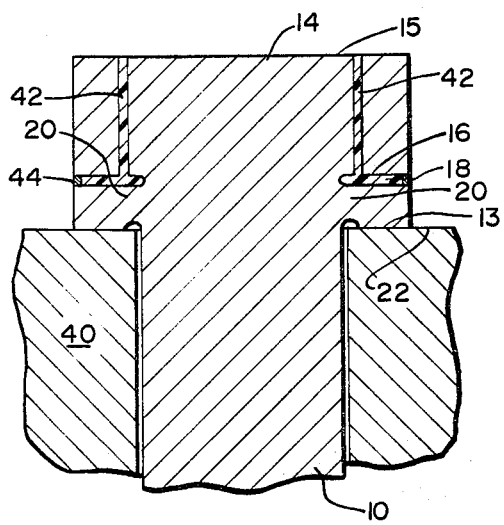
FIGS. 2a and b show a modification of my preferred embodiment in a bolt head.
Figure 2B:
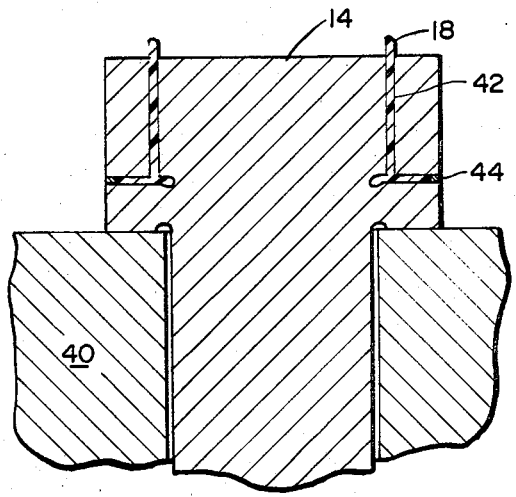

A variation of my preferred embodiment is shown in FIGS. 2a and b. One or more holes 42 are drilled into the bolt head 14 from the upper face 15 to intersect the external groove 16. The cavity formed by the external groove 16 and the holes 42 is filled with a flowable incompressible material 18. The outer edge of the groove 16 is sealed with a membrane 44, such as a flexible plastic membrane, capable of preventing extrusion of material out through the edge of the external groove. When the shear section 20 plastically deforms, as shown in FIG. 2b, the material 18 is extruded out from the holes 42 to provide a visual indication on the upper surface of the bolt head. Although two holes are shown it is obvious that one or more than two could be used.

Figure 5:
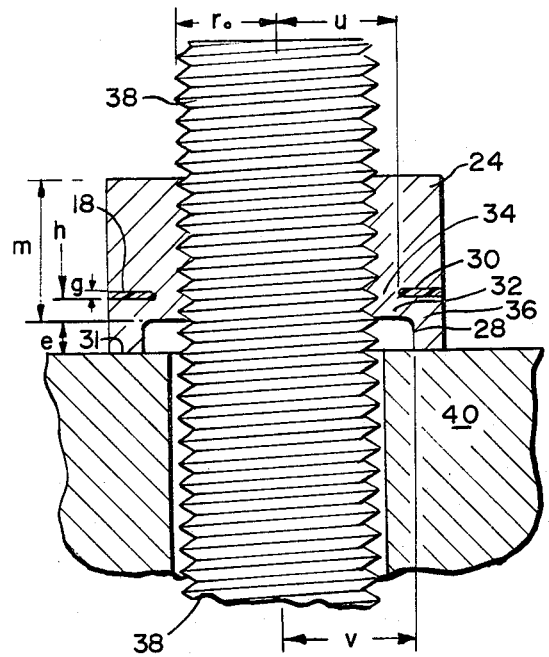
FIG. 5 is another modification of the nut.

FIG. 5 shows a hexagonal nut 24 in engagement with a threaded shaft 38. The lower face 31 or bearing surface of the nut abuts the surface 40. The nut has an internal annular groove 28 of outer radius $v$ formed in the internal, normally threaded, wall of the nut at the juncture of this wall with the lower face 31. The height $m$ of the threaded section is made equal to the height of a standard nut. An external disk-shaped annular groove 30 spaced axially a distance $h$ from the internal groove and of inner radius $u$ is formed in the outer wall of the nut and filled with a flowable incompressible material 18. Between the grooves there is formed a shear section 32 of height $h$ and of thickness $v$ minus $u$. As previously described for the bolt this shear section 32 is designed to yield plastically when a predetermined axial load acts on the nut.

In the bolt head shown in FIG. 1a the external groove 16 extends inwardly until it reaches the external radius of the bolt shaft, and the internal groove 12 is formed outwardly starting from the surface of the bolt shaft. Obviously, in the nut shown in FIG. 5 the external groove 30 cannot extend inwardly until it reaches the internal threaded surface of the nut. In fact, the section 34 between the bottom of the external groove and the threads must be made such that this section will yield plastically only at loads higher than the design load at which the shear section 32 will yield. As a result of this restraint on the depth of the external groove, in order for the internal groove 28 to overlap the external groove 30, and thus form the shear section 32, it is necessary that the internal groove extend outwardly a greater distance than would be necessary in the bolt head. Another requirement of the nut design is that the section 36 between the bottom of the internal groove and outer wall of the nut must be such that this section also will yield plastically only at loads higher than the design load at which the shear section 32 will yield. As will be obvious from a comparison of FIGS. 1a and 5, the greater depth of the internal groove 28 in the nut results in the lower face 31 or bearing surface of the nut being smaller than the lower face 13 of the bolt head. Since bearing stresses frequently are critical in bolted connections it is desirable to have a design which produces the maximum possible area on the lower face or bearing surface of the nut.

Figure 3A:
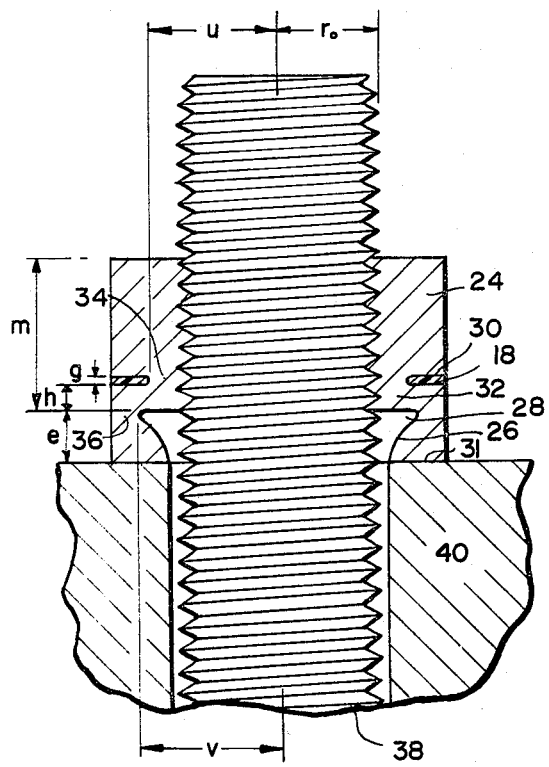
FIGS. 3a and b are sectional views of a standard hexagonal nut with my invention incorporated therein.
Figure 6:
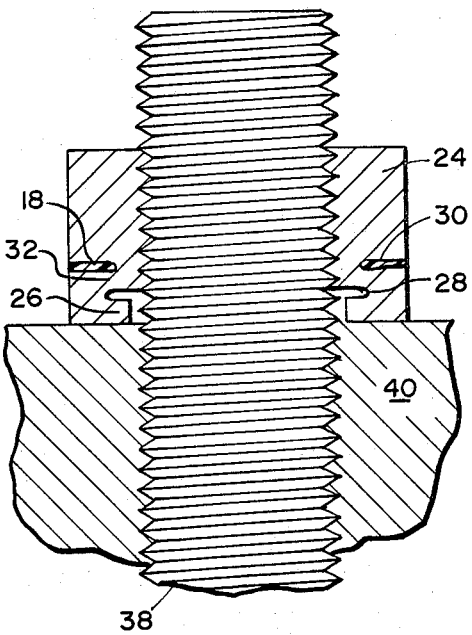
FIG. 6 is still another modification of the nut.

In FIG. 6 the internal groove 28 is formed adjacent to the lower surface 31 of the nut, leaving a web 26 between the groove and the lower surface. The internal radius of the web 26 is just large enough to provide the required clearance for the threaded shaft and thus the area of the lower face 31 is the maximum possible. I have found, however, that the same result can be obtained with easier machining by forming the internal groove for my nut as shown in FIGS. 3a and b. The upper and inner corner of the web 26 contributes little to distributing load to the abutting surface 40 so the bottom surface of the groove 28 is curved as illustrated to provide greater strength for the cutting tool used to form the internal groove 28 of outer radius $v$. The distance $e$ to the upper surface of the groove 28 is made large enough so the web 26 is sufficiently stiff to give a good distribution of bearing stress on the abutting surface 40. The height $m$ of the threaded section is made equal to the height of a standard nut. An external disk-shaped annular groove 30 of inner radius $u$ is filled with a flowable incompressible material 18. A shear section 32 is defined as heretofore described. Again the width $g$ of the external groove 30 is preferably made small to limit the amount of plastic deformation in the shear section.

Figure 3B:
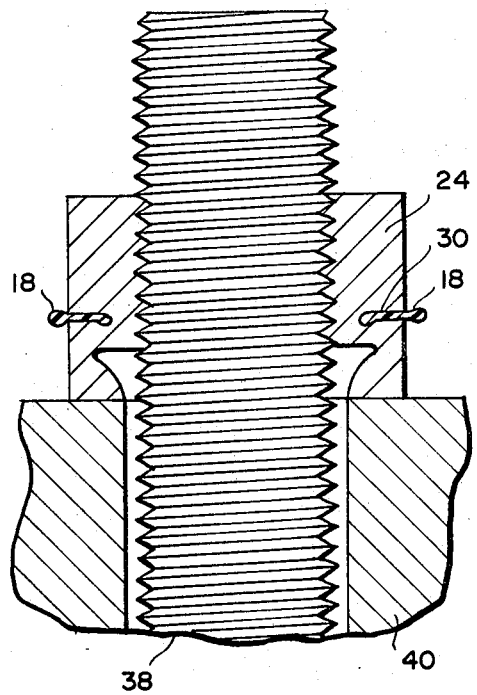

The nut 24 is engaged with a bolt 38, the lower face 31 of the nut against the abutting surface 40 as shown in FIG. 3a. When the design axial load is reached, the nut being designed to yield at this load, the yield force in the shear section 32 is reached and the section plastically deforms, the volume of the groove 30 is decreased substantially and the material 18 is extruded to provide a clear visual indication and, if desired, and electrical indication that the bolt is carrying the load for which the nut was designed, as shown in FIG. 3b.

Figure 4A:
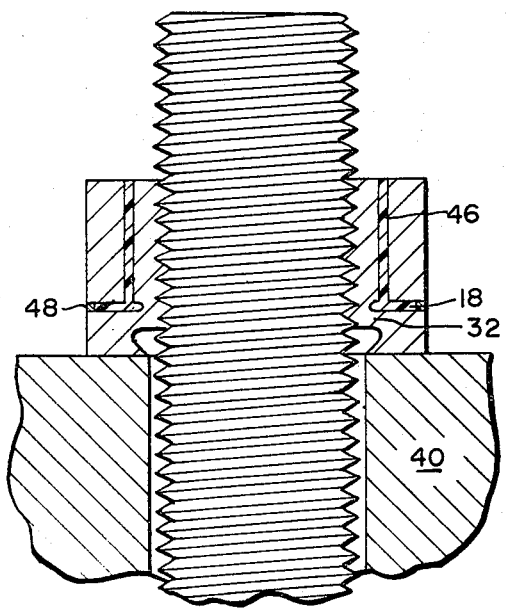
FIGS. 4a and b show a modification of my preferred embodiment in a nut.
Figure 4B:
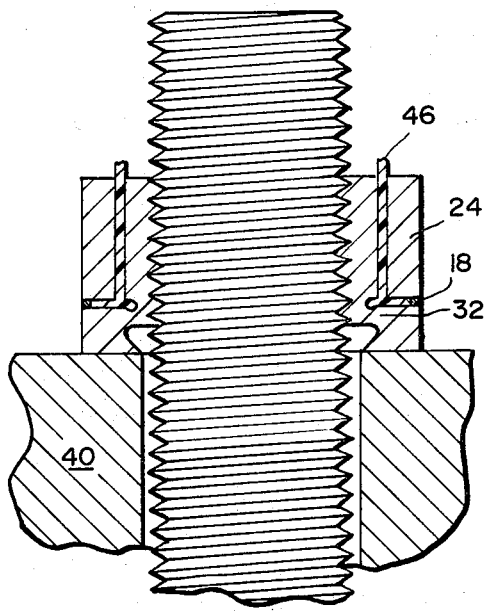

A variation of my preferred embodiment for nuts is shown in FIGS. 4a and b. Holes 46 are drilled from the upper face of the nut to intersect with the external groove 30 and both groove and holes are filled with material 18. A membrane 48 seals the outer edge of the external groove 30. When the design load in the bolt is reached the shear section 32 plastically deforms, reducing the volume in the groove 30 and extruding the material 18 out through the holes 46. Of course, one hole or more than one hole may be used if desired.

Figure 7:
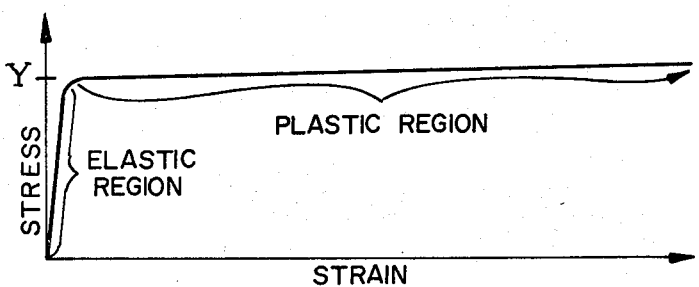
FIG. 7 shows the typical stress-strain behavior in a uniaxial tension test for the metals commonly used for bolts and nuts.

Design of the required dimensions of the shear section is a relatively straight forward matter. This design will be illustrated with reference to the preferred nut embodiment shown in FIG. 3a. First, the distances $u$ and $v$ are selected such that the grooves 28 and 30 overlap sufficiently to produce an effective shear section 32 and such that the sections 34 and 36 are dimensioned so that both yield at the same bolt load. A nut material having the uniaxial stress-strain behavior shown in FIG. 7 is then selected with the yield stress Y being sufficiently high so that the bolt load causing yielding of the sections 34 and 36 will be above the design bolt load by an acceptable safety margin.

Figure 8:
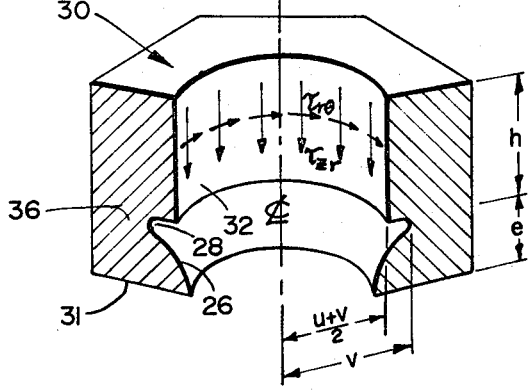
FIG. 8 shows the stresses acting on the shear section of the nut embodiment of FIG 3a during installation.

Attention now is focused on calculation of the axial distance $h$ separating the grooves 28 and 30. In FIG. 8 are shown the stresses acting on the shear section 32 during installation. The shear stress $\tau_{zr}$ carries the bolt load from the nut threads down to the lower surface 31 of the nut and is calculated from the axial force equilibrium relation, $$2\pi\left(\frac{u+v}{2}\right)h\tau_{zr}=P \qquad (I)$$

where $P$=bolt load.

The shear stress $\tau_{r\theta}$ transmits to the nut threads inside the yield section 32 the torque exerted by a wrench on the outer hexagonal surface of the nut. This stress will be of the order of $\tau_{zr}$ multiplied by the coefficient of friction $$\tau_{r\theta}\approx f\tau_{zr} \qquad (II)$$

where $f$=coefficient of friction.

Most steels used for nuts have a stress-strain behavior in a uniaxial tension test as shown in FIG. 7. There is an initial elastic region where the strain is proportional to the stress but when the stress reaches the yield stress Y there is plastic deformation (yielding) characterized by very large increases in strain with very small increase in stress such a material is said to have little strain hardening. When there is acting the biaxial state of stress shown in FIG. 8 the values of the stresses which will cause yielding can be calculated from the Mises yield criterion.

$$\tau_{zr}^2+\tau_{r\theta}^2=\frac{Y^2}{3} \qquad (III)$$

Substituting (II) in (III) we find that there will be yielding of the shear section 32 when the shear stresses $\tau_{zr}$ reaches the value $$\tau_{zr}=\frac{Y}{\sqrt{3(1+f^2)}} \qquad (VI)$$

Substituting (IV) in (I) we find the bolt load $P_Y$ which will cause yielding of the shear section 32.

$$P_Y=\frac{\pi(u+v)hY}{\sqrt{3(1+f^2)}} \qquad (V)$$

Alternatively, if the design load $P_D$ is known the dimension $h$ which will cause yielding of the shear section 32 at the load $P_D$ is given by $$h=\frac{\sqrt{3(1+f^2)}P_D}{\pi(u+v)Y} \qquad (VI)$$

It is apparent from (V) that a large variation in the coefficient of friction will have little effect on the bolt load which will cause yielding. For example, an increase in the coefficient of friction from 0.1 to 0.3 would cause only a four percent drop in the bolt load which will exist when yielding of the nut is observed. By way of contrast, if a torque wrench were being used with a standard nut a similar increase in friction would result in the bolt load being decreased by approximately two thirds.

My preferred embodiments have been described and illustrated using a standard hexagonal bolt and nut. However, it is obvious that my invention may be used with any type of nut, bolt or fastening member which is commonly used in industry. Also my design features may be incorporated into a washer.

The flowable incompressible material used in the external grooves may be clay, particulate filllers in a polymeric binder, polymeric materials, elastomers and the like. The material may also embody a dielectric filler such as iron filing in a polymeric material.

My invention as described and illustrated provides a visual, and optionally electrical, load indicating member to accurately and clearly show when the design load in the member has been reached.

What I claim is:

1. A threaded element including a load indicating member comprising a body having an upper face and a lower planar bearing face, an outer peripheral wall between said faces, a shear section within said body disposed between an internal annular groove and an external annular groove, the internal groove formed adjacent to the lower face and located radially inwardly from said outer peripheral wall and axially spaced apart from and radially the external groove formed on the outer peripheral wall overlapping the internal groove, and a flowable incompressible material disposed within the external groove whereby when a predetermined axial load equal substantially to the yield stress times the area of the shear section is placed on the member the shear section plastically deforms in axial shear reducing the volume of the external groove extruding the flowable material.

2. The member of claim 1 in which the axial width of the external annular groove is made small to limit the amount of plastic axial shear deformation.

3. The member of claim 1 in which the flowable material is electrically conducting.

4. The member of claim 1 wherein said member is a bolt, the external groove is formed in the outer wall of the bolt head and the internal groove is formed at the juncture of the lower face and the bolt shaft.

5. The member of claim 4 wherein at least one conduit extends axially from the external groove through the bolt head to the upper face, the conduit is filled with a flowable incompressible material and a membrane peripherally surrounds and is disposed in sealing contact within the external groove to seal the material within the external groove whereby when a predetermined axial load is placed on the member the shear section plastically deforms in axial shear, reducing the volume of the external groove and extruding the flowable material from the conduit at the upper face of said bolt head.

6. The member of claim 1 wherein said member is a nut, the external groove is formed in the outer wall of the nut and the internal groove is formed in the internal threaded wall at the juncture of said threaded wall and said lower face.

7. The member of claim 1 wherein said member is a nut, the external groove is formed in the outer wall of the nut, and the internal groove is formed in the internal threaded wall spaced axially apart from the lower face to form an intervening annular web.

8. The member of claim 7 wherein at least one conduit extends axially from the external groove through the nut to the upper face, the conduit filled with flowable incompressible material and a membrane peripherally surrounds and is disposed in sealing contact within the external groove to seal the material within the external groove whereby when a predetermined axial load is placed on the member the shear section plastically deforms in axial shear, reducing the volume of the external groove and extruding the flowable material from the conduit at the upper face of said nut.

References Cited

UNITED STATES PATENTS

| | | | |
|---|---|---|---|
| 2,543,705 | 2/1951 | Place | 85—9 |
| 3,174,386 | 3/1965 | Lewis | 85—12 |
| 3,194,105 | 7/1965 | Gill | 85—62 |
| 3,224,316 | 12/1965 | Grikscheit et al. | 85—62 |
| 3,306,154 | 2/1967 | Bailey | 85—62 |

EDWARD C. ALLEN, *Primary Examiner.*

CARL W. TOMLIN, *Examiner.*

R. S. BRITTS, *Assistant Examiner.*

UNITED STATES PATENT OFFICE
CERTIFICATE OF CORRECTION

Patent No. 3,383,974                      May 21, 1968

Norman C. Dahl

It is certified that error appears in the above identified patent and that said Letters Patent are hereby corrected as shown below:

Column 7, line 33, cancel "and axially spaced apart from and radially" and insert the same after "wall" in line 34, same column 7.

Signed and sealed this 21st day of October 1969.

(SEAL)

Attest:

Edward M. Fletcher, Jr.                    WILLIAM E. SCHUYLER, JR.

Attesting Officer                            Commissioner of Patents